(12) United States Patent
Trimmer et al.

(10) Patent No.: US 7,567,993 B2
(45) Date of Patent: *Jul. 28, 2009

(54) METHOD AND SYSTEM FOR CREATING AND USING REMOVABLE DISK BASED COPIES OF BACKUP DATA

(75) Inventors: Don Alvin Trimmer, Livermore, CA (US); Roger Keith Stager, Livermore, CA (US); Craig Anthony Johnston, Livermore, CA (US); Yafen Peggy Chang, Fremont, CA (US); Rico Blaser, San Francisco, CA (US)

(73) Assignee: Netapp, Inc., Sunnyvale, CA (US)

( * ) Notice: Subject to any disclaimer, the term of this patent is extended or adjusted under 35 U.S.C. 154(b) by 379 days.

This patent is subject to a terminal disclaimer.

(21) Appl. No.: 10/314,690

(22) Filed: Dec. 9, 2002

(65) Prior Publication Data

US 2004/0153739 A1    Aug. 5, 2004

(51) Int. Cl.
*G06F 12/00* (2006.01)
*G06F 17/30* (2006.01)
(52) U.S. Cl. .......................... 707/204; 711/162; 714/6
(58) Field of Classification Search ............... 707/1–10, 707/100–104.1, 200–205
See application file for complete search history.

(56) References Cited

U.S. PATENT DOCUMENTS

| | | | |
|---|---|---|---|
| 4,635,145 A | 1/1987 | Horie et al. | |
| 4,727,512 A | 2/1988 | Birkner et al. | |
| 4,775,969 A | 10/1988 | Osterlund | |
| 5,212,784 A * | 5/1993 | Sparks | 714/6 |
| 5,235,695 A | 8/1993 | Pence | |
| 5,297,124 A | 3/1994 | Plotkin et al. | |
| 5,438,674 A | 8/1995 | Keele et al. | |
| 5,455,926 A | 10/1995 | Keele et al. | |
| 5,485,321 A | 1/1996 | Leonhardt et al. | |
| 5,666,538 A | 9/1997 | DeNicola | |
| 5,673,382 A | 9/1997 | Cannon et al. | |
| 5,774,292 A | 6/1998 | Georgiou et al. | |
| 5,774,643 A | 6/1998 | Lubbers et al. | |

(Continued)

FOREIGN PATENT DOCUMENTS

EP    1333379    4/2006

(Continued)

OTHER PUBLICATIONS

"Alacritus Software's Securitus I: Pointing the Way to Virtual Tape Libraries" Aberdeen Group, Inc., Mar. 2002.

(Continued)

*Primary Examiner*—Hosain T Alam
*Assistant Examiner*—Shew-Fen Lin
(74) *Attorney, Agent, or Firm*—Perkins Coie LLP

(57) ABSTRACT

The invention is a method and system for copying backup data to a virtual tape library (VTL), where data written to the VTL can optionally be stored on removable disk media for offsite storage. The invention minimizes dependency on tape media without taxing the resources of any of the servers and without the need for the data protection application (DPA) to perform a second backup pass. Backup data written to the VTL can optionally be copied to the VTL's default storage area and/or to a predetermined set of disks that may be removed and stored offsite.

12 Claims, 2 Drawing Sheets

U.S. PATENT DOCUMENTS

| | | | |
|---|---|---|---|
| 5,774,715 A | 6/1998 | Madany et al. | |
| 5,805,864 A | 9/1998 | Carlson et al. | |
| 5,809,511 A | 9/1998 | Peake | |
| 5,809,543 A | 9/1998 | Byers et al. | |
| 5,854,720 A | 12/1998 | Shrinkle et al. | |
| 5,864,346 A | 1/1999 | Yokoi et al. | |
| 5,872,669 A | 2/1999 | Morehouse et al. | |
| 5,875,479 A | 2/1999 | Blount et al. | |
| 5,911,779 A | 6/1999 | Stallmo et al. | |
| 5,949,970 A | 9/1999 | Sipple et al. | |
| 5,961,613 A | 10/1999 | DeNicola | |
| 5,963,971 A | 10/1999 | Fosler et al. | |
| 5,974,424 A | 10/1999 | Schmuck et al. | |
| 6,021,408 A | 2/2000 | Ledain et al. | |
| 6,023,709 A | 2/2000 | Anglin et al. | |
| 6,029,179 A | 2/2000 | Kishi | |
| 6,041,329 A | 3/2000 | Kishi | |
| 6,044,442 A | 3/2000 | Jesionowski | |
| 6,049,848 A | 4/2000 | Yates et al. | |
| 6,061,309 A | 5/2000 | Gallo et al. | |
| 6,067,587 A | 5/2000 | Miller et al. | |
| 6,070,224 A | 5/2000 | LeCrone et al. | |
| 6,098,148 A | 8/2000 | Carlson | |
| 6,128,698 A | 10/2000 | Georgis | |
| 6,131,142 A | 10/2000 | Kamo et al. | |
| 6,131,148 A | 10/2000 | West et al. | |
| 6,163,856 A | 12/2000 | Dion et al. | |
| 6,173,359 B1 | 1/2001 | Carlson et al. | |
| 6,195,730 B1 | 2/2001 | West | |
| 6,225,709 B1 | 5/2001 | Nakajima | |
| 6,247,096 B1 | 6/2001 | Fisher et al. | |
| 6,260,110 B1 | 7/2001 | LeCrone et al. | |
| 6,266,784 B1 | 7/2001 | Hsiao et al. | |
| 6,269,423 B1 | 7/2001 | Kishi | |
| 6,269,431 B1 | 7/2001 | Dunham | |
| 6,282,609 B1 | 8/2001 | Carlson | |
| 6,289,425 B1 | 9/2001 | Blendermann et al. | |
| 6,292,889 B1 | 9/2001 | Fitzgerald et al. | |
| 6,301,677 B1 | 10/2001 | Squibb | |
| 6,304,880 B1 | 10/2001 | Kishi | |
| 6,304,882 B1 | 10/2001 | Strellis et al. | |
| 6,317,814 B1 | 11/2001 | Blendermann et al. | |
| 6,324,497 B1 | 11/2001 | Yates et al. | |
| 6,327,418 B1 | 12/2001 | Barton | |
| 6,336,163 B1 | 1/2002 | Brewer et al. | |
| 6,336,173 B1 | 1/2002 | Day et al. | |
| 6,339,778 B1 | 1/2002 | Kishi | |
| 6,341,329 B1 * | 1/2002 | LeCrone et al. | 711/112 |
| 6,343,342 B1 | 1/2002 | Carlson | |
| 6,353,837 B1 | 3/2002 | Blumenau | |
| 6,360,232 B1 | 3/2002 | Brewer et al. | |
| 6,389,503 B1 | 5/2002 | Georgis et al. | |
| 6,408,359 B1 | 6/2002 | Ito et al. | |
| 6,487,561 B1 | 11/2002 | Ofek et al. | |
| 6,496,791 B1 | 12/2002 | Yates et al. | |
| 6,499,026 B1 | 12/2002 | Rivette et al. | |
| 6,557,073 B1 * | 4/2003 | Fujiwara et al. | 711/111 |
| 6,557,089 B1 | 4/2003 | Reed et al. | |
| 6,578,120 B1 | 6/2003 | Crockett et al. | |
| 6,615,365 B1 | 9/2003 | Jenevein et al. | |
| 6,625,704 B2 | 9/2003 | Winokur | |
| 6,654,912 B1 | 11/2003 | Viswanathan et al. | |
| 6,658,435 B1 | 12/2003 | McCall | |
| 6,694,447 B1 | 2/2004 | Leach et al. | |
| 6,725,331 B1 | 4/2004 | Kedem | |
| 6,766,520 B1 | 7/2004 | Rieschl et al. | |
| 6,779,057 B2 | 8/2004 | Masters et al. | |
| 6,779,058 B2 | 8/2004 | Kishi et al. | |
| 6,779,081 B2 | 8/2004 | Arakawa et al. | |
| 6,816,941 B1 | 11/2004 | Carlson et al. | |
| 6,816,942 B2 | 11/2004 | Okada et al. | |
| 6,834,324 B1 | 12/2004 | Wood | |
| 6,850,964 B1 | 2/2005 | Brough et al. | |
| 6,877,016 B1 | 4/2005 | Hart et al. | |
| 6,915,397 B2 | 7/2005 | Lubbers et al. | |
| 6,931,557 B2 | 8/2005 | Togawa | |
| 6,950,263 B2 | 9/2005 | Suzuki et al. | |
| 6,957,291 B2 * | 10/2005 | Moon et al. | 710/302 |
| 6,959,368 B1 * | 10/2005 | St. Pierre et al. | 711/162 |
| 6,973,369 B2 | 12/2005 | Trimmer et al. | |
| 6,973,534 B2 | 12/2005 | Dawson | |
| 6,978,325 B2 | 12/2005 | Gibble | |
| 7,032,126 B2 | 4/2006 | Zalewski et al. | |
| 7,032,131 B2 | 4/2006 | Lubbers et al. | |
| 7,055,009 B2 | 5/2006 | Factor et al. | |
| 7,072,910 B2 | 7/2006 | Kahn et al. | |
| 7,096,331 B1 | 8/2006 | Haase et al. | |
| 7,100,089 B1 | 8/2006 | Phelps | |
| 7,107,417 B2 * | 9/2006 | Gibble et al. | 711/161 |
| 7,111,136 B2 | 9/2006 | Yamagami | |
| 7,117,324 B2 * | 10/2006 | Scheid | 711/162 |
| 7,127,388 B2 | 10/2006 | Yates et al. | |
| 7,143,307 B1 | 11/2006 | Witte et al. | |
| 7,152,077 B2 | 12/2006 | Veitch et al. | |
| 7,155,586 B1 | 12/2006 | Wagner et al. | |
| 7,200,546 B1 | 4/2007 | Nourmohamadian et al. | |
| 2001/0047447 A1 | 11/2001 | Katsuda | |
| 2002/0004835 A1 | 1/2002 | Yarbrough | |
| 2002/0016827 A1 | 2/2002 | McCabe et al. | |
| 2002/0026595 A1 | 2/2002 | Saitou et al. | |
| 2002/0095557 A1 | 7/2002 | Constable et al. | |
| 2002/0133491 A1 | 9/2002 | Sim et al. | |
| 2002/0144057 A1 | 10/2002 | Li et al. | |
| 2002/0163760 A1 | 11/2002 | Lindsay et al. | |
| 2002/0166079 A1 | 11/2002 | Ulrich et al. | |
| 2002/0171546 A1 | 11/2002 | Evans et al. | |
| 2002/0199129 A1 | 12/2002 | Bohrer et al. | |
| 2003/0004980 A1 | 1/2003 | Kishi et al. | |
| 2003/0037211 A1 | 2/2003 | Winokur | |
| 2003/0097462 A1 | 5/2003 | Parent et al. | |
| 2003/0120476 A1 | 6/2003 | Yates et al. | |
| 2003/0120676 A1 | 6/2003 | Holavanahalli et al. | |
| 2003/0126388 A1 | 7/2003 | Yamagami | |
| 2003/0135672 A1 | 7/2003 | Yip et al. | |
| 2003/0149700 A1 | 8/2003 | Bolt | |
| 2003/0182301 A1 | 9/2003 | Patterson et al. | |
| 2003/0182350 A1 | 9/2003 | Dewey | |
| 2003/0188208 A1 | 10/2003 | Fung | |
| 2003/0217077 A1 | 11/2003 | Schwartz et al. | |
| 2003/0225800 A1 | 12/2003 | Kavuri | |
| 2004/0015731 A1 | 1/2004 | Chu et al. | |
| 2004/0098244 A1 | 5/2004 | Dailey et al. | |
| 2004/0181388 A1 | 9/2004 | Yip et al. | |
| 2004/0181707 A1 | 9/2004 | Fujibayashi | |
| 2005/0010529 A1 | 1/2005 | Zalewski et al. | |
| 2005/0044162 A1 | 2/2005 | Liang et al. | |
| 2005/0063374 A1 | 3/2005 | Rowan et al. | |
| 2005/0065962 A1 | 3/2005 | Rowan et al. | |
| 2005/0066118 A1 | 3/2005 | Perry et al. | |
| 2005/0066222 A1 | 3/2005 | Rowan et al. | |
| 2005/0066225 A1 | 3/2005 | Rowan et al. | |
| 2005/0076070 A1 | 4/2005 | Mikami | |
| 2005/0076261 A1 | 4/2005 | Rowan et al. | |
| 2005/0076262 A1 | 4/2005 | Rowan et al. | |
| 2005/0076264 A1 | 4/2005 | Rowan et al. | |
| 2005/0144407 A1 | 6/2005 | Colgrove et al. | |
| 2006/0047895 A1 | 3/2006 | Rowan et al. | |
| 2006/0047902 A1 | 3/2006 | Passerini | |
| 2006/0047903 A1 | 3/2006 | Passerini | |
| 2006/0047905 A1 | 3/2006 | Matze et al. | |
| 2006/0047925 A1 | 3/2006 | Perry | |
| 2006/0047989 A1 | 3/2006 | Delgado et al. | |
| 2006/0047998 A1 | 3/2006 | Darcy | |
| 2006/0047999 A1 | 3/2006 | Passerini | |

| | | |
|---|---|---|
| 2006/0143376 A1 | 6/2006 | Matze et al. |

FOREIGN PATENT DOCUMENTS

| | | |
|---|---|---|
| EP | 1 671 231 | 6/2006 |
| EP | 1 671231 | 6/2006 |
| WO | WO99/03098 | 1/1999 |
| WO | WO99/06912 | 2/1999 |
| WO | WO2005/031576 | 4/2005 |
| WO | WO2006/023990 | 3/2006 |
| WO | WO2006/023990 | 3/2006 |
| WO | WO2006/023991 | 3/2006 |
| WO | WO2006/023992 | 3/2006 |
| WO | WO2006/023993 | 3/2006 |
| WO | WO2006/023994 | 3/2006 |
| WO | WO2006/023995 | 3/2006 |

OTHER PUBLICATIONS

"Product Brief: Rhapsody/Alacritus-Secritus/XPath Virtual Tape in the Fabric" The Enterprise Storage Group, Aug. 2002.

"Alacritus, Hitachi CP and Nissho Team to Create Virtual Tape Library Appliance: Industry's First Virtual Tape Library Appliance to Replace Storage Tape Libraries" Alacritus Software, Inc. Jun. 25, 2001.

"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alactrius Software, Inc., Oct. 3, 2001.

Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.

"Alacritus Software Announces Virtual Tape Library for Legato NetWorker Data Protection Solution" Alacritus Software, Inc., Jan. 8, 2002.

"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.

Biggar, Heidi, "Disk and Tape Forge New Partnership in Backup Arena" InfoStor, Nov. 2001.

Preston, W. Curtis, "Surprise! Cheap Disks Cure Slow Backup" Storage Magazine, Jun. 1, 2002.

"Alacritus, Hitachi CP and Nissho Team to Create Virtual Tape Library" internetnews.com, Jun. 25, 2001.

"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup performance and Scalability" Alacritus Software, Jul. 8, 2002.

Camphuisen, Alicia, "Hitachi Inks OEM Deal with Legato" Knapp Comm., Jul. 17, 2002.

"Alacritus Announces Disk-Based Successor to Tape" Knapp Comm., Jul. 17, 2002.

Biggar, Heidi, "Alacritus Enables Disk-Based Backup" InfoStor, Sep. 2001.

"Securitusl White Paper: Disk Based Data Proctection for Alacritus Software" Alacritus Software, Inc., Jul. 2001.

"Alacritus Software FAQs" Alacritus Software, Inc., Jul. 2001.

"Disk-Based Data Protection" Alacritus Software, Inc., Jul. 2001.

"Disked-Based Data Protection" Alacritus Software, Inc., Sep. 2002.

"Virtual Tape Library Technology Brochure" Alacritus Software, Inc., Jul. 2001.

"Disk-Based Data Protection" Alacritus Software, Inc., Sep. 2001.

"Disk-Based protection" Alacritus Software, Inc., Jul. 2001.

"Disk-Based Data Protectoin" Alacritus Software, Inc. Sep. 2002.

"Securitus I White Paper: Disk Based Data Protection for Alacritus Software" Alacritus Software, Inc., Jul. 2001.

* cited by examiner

METHOD AND SYSTEM FOR CREATING AND USING REMOVABLE DISK BASED COPIES OF BACKUP DATA

FIELD OF THE INVENTION

Background Art

The present invention relates to data protection and more particularly to the management and storage of backup data.

Data protection (which includes backing up computer data, restoring computer data, securing computer data, and managing computer data storage) and disaster recovery procedures are essential processes to organizations that use computers. In fact, data protection is the single most expensive storage administrative task. Most large organizations perform data backups to tape media and use a robotically-controlled tape library or tape jukebox to assist with backup automation. Performing and managing backups and restores involves many functions including, for example, media management (including tape tracking, rotation and off-site storage), tape jukebox management, file tracking, backup scheduling, assisted or automated data restore and data archival.

In order to effectively perform the above functions, a sophisticated data protection application (DPA) is required. Examples of such DPAs include, for example, Legato NetWorker, Veritas BackupExec and CA ArcServe. DPAs automate and assist with the essential functions of data protection. DPAs are designed specifically to work with physical tape media, tape drives and tape libraries. Most of the complexity in DPAs relates to their interaction with physical tape.

An important procedural requirement of data protection programs is to physically move tapes after backups have been completed to an offsite location. The tapes are stored in the offsite location so that they may be retrieved in case of a major onsite disaster. Shipping the only copy of backup tapes offsite, however, means that each time minor restores need to be performed, the backup tape must be shipped back onsite. This is particularly problematic because the most likely tape that will be required for minor restores is the latest backup tape, which at many sites, is moved offsite as early as the same day the backup for that day is completed.

To alleviate the problems associated with shipping backup tapes offsite, it is possible for a DPA to make a copy of a physical tape so that there is one copy that can stay onsite and one copy that can be stored offsite. This process, however, is cumbersome and very CPU intensive and typically involves duplicating the tape and its file index information—practically backing up the same data a second time. Furthermore, because of the inherent shortcomings of tape media, it is nearly impossible to duplicate physical tapes without using a DPA. Incidentally, this very same problem is encountered if the DPA is used to backup data directly to disk. While a general purpose disk, if used correctly, may provide a better medium for fast local restores, off-siting requirements still require a second (potentially very resource intensive) backup cycle onto tape.

A method and system is therefore needed where backup data can be copied to a disk based storage medium while also creating additional removable disk based copies of the backup data for offsite storage, as desired.

SUMMARY

The invention is a method and system for copying backup data to a virtual tape library (VTL), where data written to the VTL can optionally be stored on removable disk media (in the form of individual disks or sets of disks) for offsite storage. This process minimizes dependency on tape media without taxing the resources of any of the servers and without the need for the DPA to perform a second backup pass. Backup data written to the VTL may be copied to the VTL's default storage area as well as a predetermined set of disks that may be removed and stored offsite, as desired.

BRIEF DESCRIPTION OF THE DRAWING(S)

DETAILED DESCRIPTION OF THE PREFERRED EMBODIMENT(S)

Figure 1:
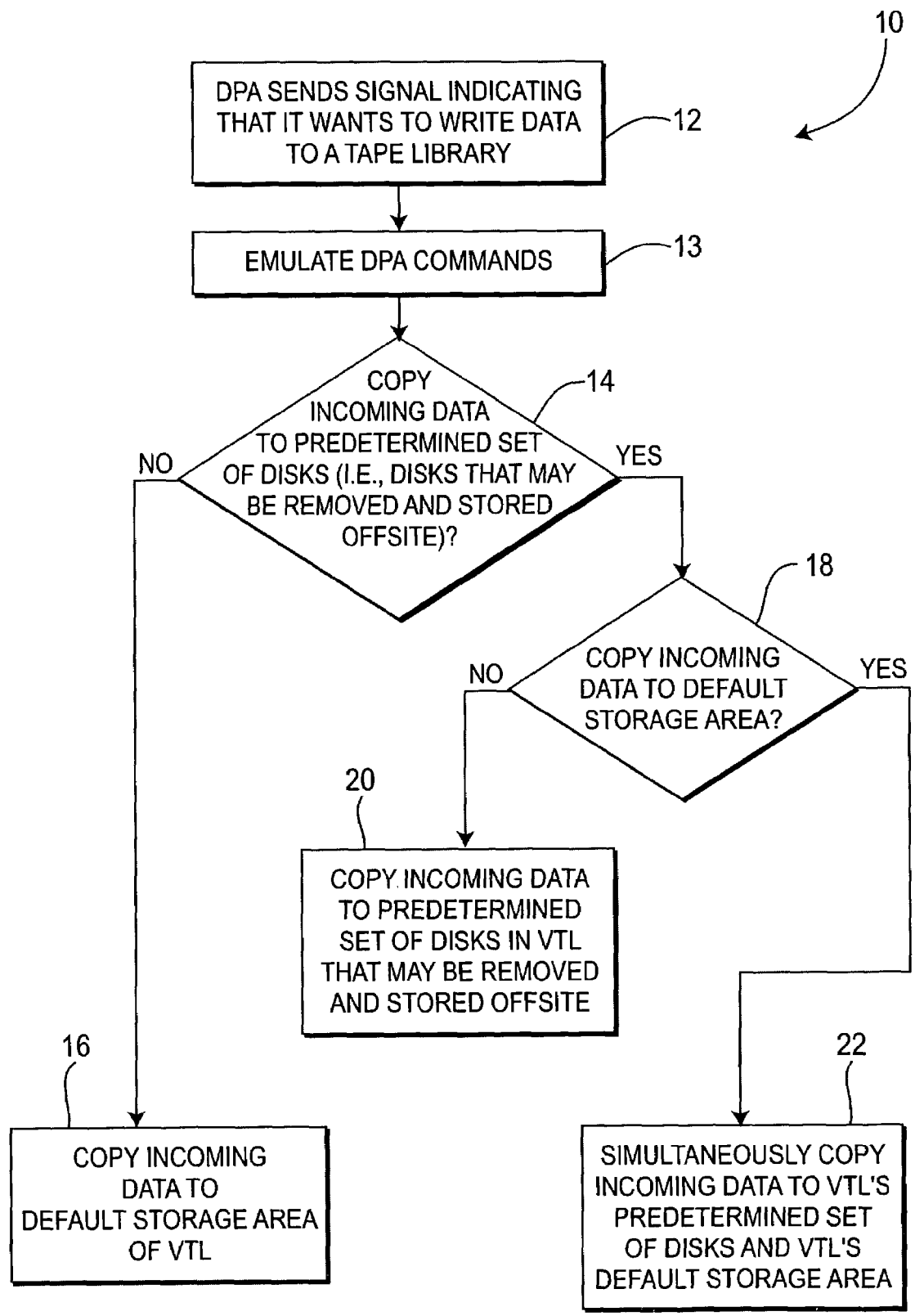
FIG. 1 is a diagram showing a method for copying backup data in accordance with the preferred embodiment of the invention.

Referring now to FIG. 1, a method 10 for copying backup data is shown. For sake of clarity, backup data, for purposes of describing the preferred embodiments, is any data that has been backed-up from any type of computer network or application. Typically, a DPA is used to backup or restore data. Therefore, the method 10 starts when the DPA sends a signal (a write command) indicating that it wants to begin writing data to a tape library (step 12). The DPA does not know, or care, whether it is writing to a physical tape library (PTL) or a virtual tape library (VTL) (because the VTL emulates the exact behavior of a PTL) and pursuant to the present invention, the DPA does not have to know. Therefore, the write signal sent by a DPA, may be sent unmodified, regardless of whether the DPA is writing to a PTL or a VTL. Tape library commands implemented in response to DPA commands for writing data are emulated in step 13. Emulation of tape library commands are described in detail in the Applicants' patent application entitled METHOD AND SYSTEM FOR EMULATING TAPE LIBRARIES which is being filed currently on even date with this present application. The entirety of the Applicants' patent application entitled METHOD AND SYSTEM FOR EMULATING TAPE LIBRARIES is hereby incorporated by reference.

In general, a VTL is a disk based repository or storage medium for backup data. The VTL is a logical representation of a PTL. It exhibits all the behaviors of a PTL—it appears to have a robotic arm, one or more tape drives, tape cartridge slots, mailbox (entry/exit) slots and a bar code reader. It can respond on the bus (SCSI or FC) in exactly the same way as a PTL. Furthermore, the characteristics of a VTL are defined by virtual library types. A VTL type defines how many tape drives and tape slots the library should have, as well as how the library should identify itself when probed on the bus.

Similar to the VTL, a virtual tape is a logical representation of a physical tape. Virtual tapes are used inside VTLs and written to by virtual tape drives in the same way as physical tapes. When a virtual tape is created, a tape label and a tape size are associated with it. This label is used to identify a particular virtual tape, which in turn comprises particular virtual tape files. Tape labels in a VTL are reported to the DPA in exactly the same way as tape barcode labels are reported by a PTL. The tape size is used to send an end-of-tape signal to the DPA when the virtual tape is full. If individual disks are shipped off-site instead of physical tape media, the end-of-tape signal can be sent when the disk is full.

Copying the contents of a VTL is just as critical as copying the contents of a PTL when dealing with site failures. Copying the contents of a VTL, however, does not require a DPA and is much easier and more flexible. Furthermore, the disk based VTL is more reliable than tape media and a PTL.

When writing data to a VTL, the DPA writes the data to the VTL in exactly the same format as if the DPA was writing the data to physical tape or a PTL. While the DPA is writing data to the VTL, a log is kept of all write operations made by the DPA to the VTL. Maintaining the log of write operations allows the particular sequence in which the data was copied to the VTL to be played back in the same way it was received from the DPA. This provides all of the benefits of disk based, randomly accessible, backup data while allowing, if necessary, physical tapes to be conveniently created without using the DPA. Physical tapes created by playing back data written to the VTL are equivalent to physical tapes created using a DPA. If the virtual tapes are kept in the VTL once the physical tapes are created, serverless tape cloning is achieved, resulting in a virtual tape that remains at the local site, and the equivalent physical tape that can be taken off-site. The operation is serverless because the backup server and the DPA are not involved in this process.

Pursuant to another one of the applicants' inventions, which is currently pending in the U.S. Patent and Trademark Office as application Ser. No. 10/218,249 and the entirety of which is incorporated by reference, data in one VTL may be electronically copied or otherwise copied to another remotely located VTL or VTLs. However, creating an offsite copy of backup data by copying between VTLs requires a very high bandwidth data link between the local VTL and the remote VTL. Therefore, physically shipping disks offsite for disaster recovery, while maintaining an onsite VTL copy for day-to-day functions, such as minor restores, may be more economical for certain organizations, while keeping data on disk at all times.

Furthermore, removal of disks, either individually or as removable data blades (i.e. redundant array of independent disk (RAID) sets or even just a bunch of disks (JBODs)), may safely and conveniently be accomplished by powering down the disks that will be removed before they are actually detached from the other disks and moved off-site. Protecting disks that may be removed and stored offsite by powering them down prior to them actually being detached from the other disks is explained in detail in applicants' U.S. patent application Ser. No. 10/211,920, the entirety of which is incorporated by reference.

Referring again to FIG. 1, once the DPA indicates that it wants to begin writing data, the method 10 continues, generally speaking, by determining whether the data, which as explained is written in the format of a physical tape, will be copied to a default storage area in the VTL or to a predetermined set of disks which may be removed and stored offsite or to both the default storage area and the predetermined set of disks. Once the determinations are made, the incoming data is actually written or otherwise copied to the VTL in accordance with those determinations. In other words, virtual tapes may be written to one or more physical disk locations simultaneously if desired.

Therefore, once the DPA indicates that it wants to begin writing data, the method proceeds to step 14 to make a first determination of whether the incoming data (which is part of a virtual tape) will be copied in real-time to one or more removable predetermined sets of disks in the VTL. The predetermined sets of disks are removable so that, in the event they are to be removed, they may be conveniently detached from other disks inside the VTL, removed from the VTL and stored offsite, as desired.

If the incoming data will not be copied to one of the predetermined sets of disks, the method proceeds to step 16. In step 16, the incoming data written by the DPA is only copied to the VTL's default storage area, but can later be copied to the predetermined set of disks as desired. The default storage area of the VTL is typically, but not necessarily, stationary or otherwise non-removable. If, in contrast, the incoming data will be copied to one of the predetermined sets of disks, the method proceeds to step 18. Step 18 is a decision point where, now that it is known that the incoming data will be copied to a set of predetermined disks, a second determination is made as to whether the incoming data will also be copied to the VTL's default storage area. This would create two identical copies of one or more virtual tapes on different physical disk sets.

If the incoming data will not also be copied to the VTL's default storage area, the incoming data is only copied to one of the predetermined sets of disks, which may be removed and stored offsite (step 20), as desired. This is essentially the disk-equivalent of writing to physical tapes and taking these off-site in that no local copy of the data is available for minor restores. At any time before the disks are removed, virtual tapes can, of course, also be copied to the default storage area as desired. If the incoming data will also be copied to the VTL's default storage area, the method continues in step 22 where the incoming data is simultaneously copied to the default storage area as well as the predetermined set of disks (effectively implementing real-time, serverless cloning because two sets of virtual tapes get created simultaneously without the need to create independent copies via the DPA).

It is important to note that the DPA does not need to be aware of any of these decisions (although the DPA could potentially be modified to take advantage of these features and to provide a single point of management). The DPA believes that it is writing to a physical tape. Later, copies of data stored in the VTL's default storage area may be copied to a predetermined set of disks simply for convenience sake or as the need arises (for example for unscheduled off-siting). Similarly, virtual tapes could also be exported or cloned to physical tape if desired for backward compatibility or otherwise, without intervention of the DPA. If necessary, disks in the default storage area may also be removed. It is conceivable that all disks in the VTL are removable disks. However, typically, a specific set of disks is removable and used for off-siting. At the shipping destination (vault, etc), the removable disks can be cloned again to stationary disks such that the number of removable, ruggadized disks can be kept relatively small (only for data in transit). It is also important to note that data copied to any of the predetermined sets of disks may similarly be used to copy data to the default storage area.

Data is written to the VTL as if it was written to a PTL and the default storage area is in the format of a typical tape library, i.e. a collection of virtual tapes having data saved as if the DPA saved it directly thereon. However, as explained, in a VTL the data is actually saved on disks allowing the data to be randomly accessed as well as played back to create a physical tape as desired.

The predetermined sets of disks, i.e. any disk or set of disks that is typically designated for removal and offsite storage, may be separate from the default storage area and may contain any amount or type of data written to the VTL, as desired. That is, data in the predetermined sets of disks may or may not be in the format of a typical tape library. Therefore, it is possible to copy to these disks particular portions of the data written to the VTL as desired. For example, the VTL and DPA may be configured so that virtual tapes related to a company's billing information are copied to a particular set of disks, so that those disks may be removed from the VTL at predetermined time intervals and stored offsite. This can be accomplished, for example, by creating a virtual tape library that is used to backup billing information. The DPA is configured to write all billing information to this library and the VTL is configured to copy all virtual tapes from this library to the default storage area every day of the week, as well as to a specific set of disks once a week. Incoming data is then copied to the appropriate disks in real-time and a copy of the weekly backup can be taken off-site, while always keeping a local copy. As described in the preceding example, data written to the VTL may be broken down into any number of subsets, preferably in the form of virtual tapes, and copied to any number of separate sets of disks. A separate set of disks may or may not correspond or otherwise be designated for each subset. Furthermore, it is possible, at any time, to copy virtual tapes from the default storage area to the removable disks and vice versa, even if the data was not written to both areas when a virtual tape was created (i.e. as mentioned above in connection with steps 22 and 16). This allows an operator to create sets of removable tapes multiple times, at any time, and onto different sets of removable media.

One schema that is particularly suitable for use with backup software is to set the tape size to the size of the removable disks. This way, each disk corresponds to a logical tape. When physical disks are taken off-site, the backup software can then track these disks with the same media management procedures used to track physical tapes.

There is no limit to the amount of predetermined disks that are designated as disks that may be removed and stored offsite. Therefore, in addition to the billing information, data pertaining to letters written to clients, for example, may also be copied to another set of removable disks that also will be removed at a particular predetermined interval, which may or may not be the same as other disks having other data thereon, and stored offsite. The copying of data to disks outside of the default storage area may also be server specific, thereby allowing each server to be fully restored using a particular single disk or set of disks. This avoids having to transport a large set of disks back on-site when a single server needs to be restored.

As mentioned, data written to the VTL may be broken down into subsets and copied to disk sets as needed to satisfy any type of data protection criteria. However, it is typically preferable for all backup data written to the VTL to not only be copied to the default storage area, but also to disks making up the predetermined sets of disks that may be removed and stored offsite. Therefore, where application specific subsets are used, it is preferable to have a separate complete offsite copy of all data stored in the default storage area or to ensure that a complete restore can be performed using the various subsets. This is easily accomplished using the present invention as data written to the VTL may be copied, as desired, to any number of disks inside and/or outside the default storage area. Naturally, critical data needs to be moved off-site more frequently than other, less critical data.

To provide a further example, the copying of data to disks outside of the default storage area may be performed at predetermined time intervals. Therefore, continuing with the example set forth above, virtual tapes containing billing information may be copied to disks outside the default storage area on a weekly basis, allowing those disks to be removed and stored offsite on a weekly basis. The removable disk media is managed similarly to today's media management solutions for tape media. It is also important to note that there does not have to be any particular criterion that delineates which data will be copied to disks designated for removal and storage. That is, all virtual tapes or data written to the VTL may be copied to the default storage area as well as to specified disks that will be removed and stored offsite. In that case, the criteria may simply be that data written to the VTL is copied to the default area on a daily basis and additionally to the predetermined sets of disks on a weekly basis so that real-time, serverless cloning takes place once a week.

Where data is copied both inside and outside of the default storage area, that data may be copied in real time or at a later time, as desired (this is still serverless cloning in that it doesn't tax any of the application servers or the DPA, but is not performed in real-time). For example, it may be more efficient for certain organizations to separately copy the data to the disks inside the default storage area and then to the disks designated for removal and offsite storage. Alternatively, certain organizations may prefer simply copying the data to the default storage area and limiting the copying of data to separate disks to an as-needed basis. For example, an organization having a single VTL in one location and an insufficient data link for electronically copying large files from the VTL to a remote user, may use the present invention to conveniently create and ship to the user a disk or set of disks having the data required to restore the user's system. This substantially decreases the time it takes for the data to be made available for restore, by circumventing the cumbersome interaction with a PTL and by always keeping the backup data on active media (disk drives) rather than passive media (tapes).

It should be noted that all of the disks in the VTL, i.e. inside and outside of the default storage area may be removed and used for a restore as needed. That is, for example, a restore may be performed by using a previously created copy that is being stored offsite or by removing and using a copy existing in the default storage area. Disks stored offsite may also be used to restore the VTL itself if data in the default storage area or parts of the meta data is lost. A restore may also be performed by copying the necessary data from the default storage area to a disk outside the default storage area and by using that newly created disk to perform the restore. The choice of how to perform a restore is a matter of organization policy and personal preference.

Figure 2:
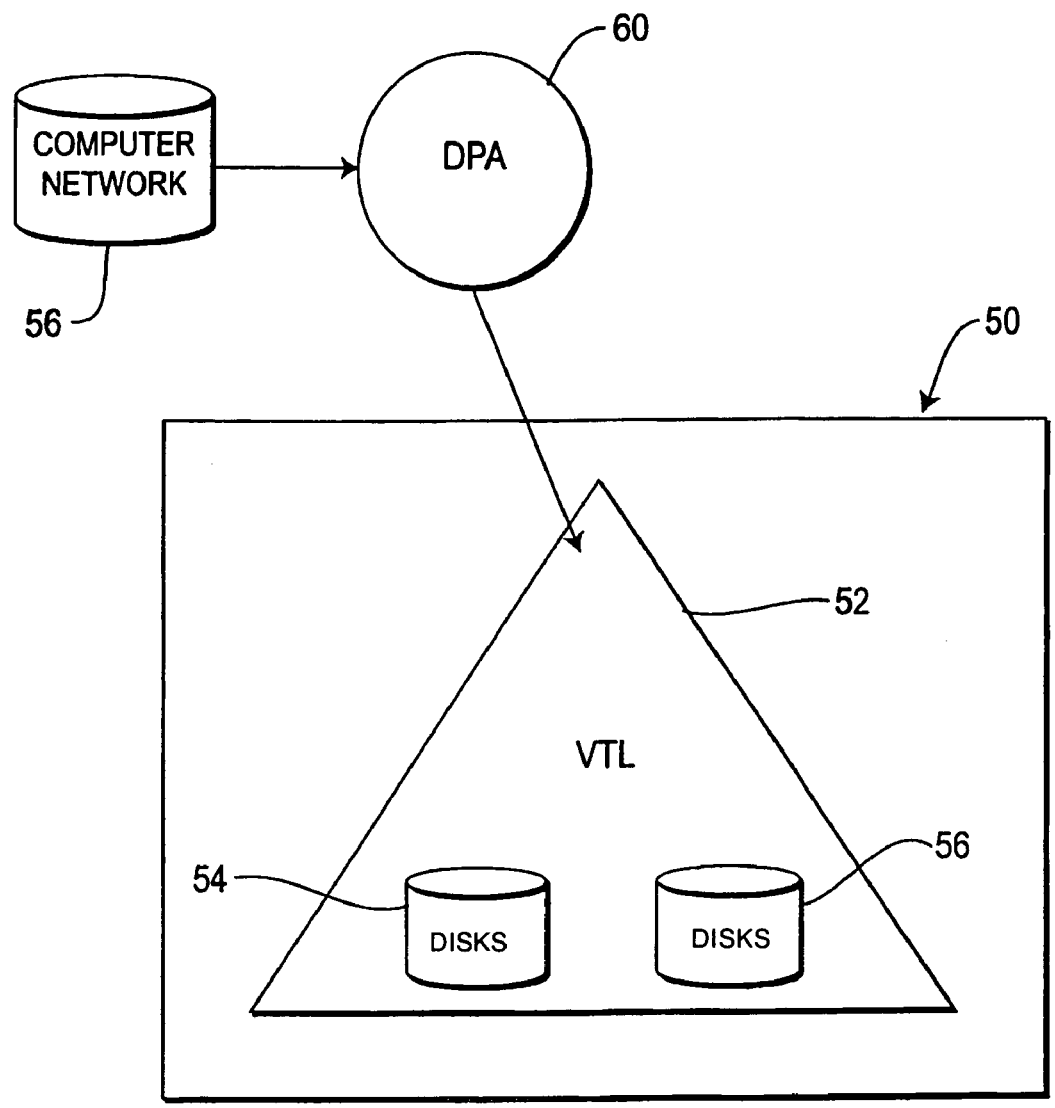
FIG. 2 is a system where backup data may be copied in accordance with the preferred embodiment of the invention.

Referring now to FIG. 2, there is shown a system 50. The system 50 comprises a VTL 52 capable of receiving data written in the same format as if it were written to a PTL. Data originating in a computer network 56 is backed up to the VTL 52, preferably using a DPA 60. The DPA 60 writes the data to the VTL 52 in exactly the same format as if the DPA 60 was writing the data to tape, including file marks, record marks, and the like. While the DPA 60 is writing the data to the VTL 52, a log is kept of all the write operations performed by the DPA 60, as explained above.

The data may then be copied to disks 54 that make up the VTL's default storage area and to disks 56 that are designated for removal and offsite storage, as desired. Disks 56 are located within the VTL, but outside the default storage area, and may be removed from the VTL and stored offsite. Any criteria may be established for delineating whether data may be copied to disks 54 or disks 56 and there is no limit to the number of actual disks or the amount disk space making up disks 54 or 56. Furthermore disks 54 and 56 may be redundant arrays of independent disks (RAID).

Disks 54 and 56 may be used to perform restores, as desired, and to create physical tapes, if necessary. For example, in the event of a major onsite disaster, disks 56, which are removed and stored offsite, may be retrieved and used to perform a complete restore. For minor restores, it is often more convenient to use disks 54. For restores, either minor or major, disks 54 or 56 may be used depending on which is more appropriate in light of the particular restore being performed. It is important to note that the present invention provides system administrators with complete flexibility in how restores are performed, which often varies from case to case, and in how data written to the VTL is copied and stored.

In addition, any type of data may be copied and stored on the disks of a VTL—not just backup data. That is, the present invention is not limited to just copying backup data as defined in paragraph 15 which was so defined for purposes of describing the preferred embodiments, but rather may be any type of data. For example, an alternate embodiment of the invention is to copy multimedia data in the same fashion as described above.

Although the present invention has been described in detail, it is to be understood that the invention is not limited thereto, and that various changes can be made therein without departing from the spirit and scope of the invention, which is defined by the attached claims.

What is claimed is:

1. A method for creating and using removable disk based copies of backup data, the method comprising:
   using a data protection application (DPA) for copying backup data to a virtual tape library wherein the DPA copies to the virtual tape library as if the DPA were copying to a physical tape library, the copying including:
      copying backup data to the virtual tape library as indicated by emulated data protection commands of the DPA, wherein the backup data is divided into user defined application specific subsets based on categories of data; and
      copying backup data simultaneously to both a predetermined set of disks and to a default storage area within the virtual tape library so that the backup data copied to the default storage area is maintained in the virtual tape library and the backup data copied to the predetermined set of disks is selectively removed for offsite storage;
   maintaining a log of a sequence of write operations, made by the DPA to both the predetermined set of disks and the default storage area within the virtual tape library, to playback the backup data without using the DPA, and to clone the backup data from the virtual tape library to the physical tape library without using the DPA, and
   managing data storage in the virtual tape library such that the DPA is not aware of decisions made regarding where in the virtual tape library the backup data is stored.

2. The method of claim 1 wherein the virtual tape library is a disk based storage medium.

3. The method of claim 1 wherein the predetermined set of disks is a redundant array of independent disks (RAID).

4. The method of claim 1 wherein the predetermined set of disks is a plurality of removable data blades.

5. The method of claim 1 wherein the predetermined set of disks are powered down separately from the default storage area.

6. The method of claim 1 wherein the data protection application is aware of the decisions made regarding where in the virtual tape library backup data is stored.

7. A machine readable storage medium having a stored set of instructions executable by a machine for creating and using removable disk based copies of backup data, the method comprising:
   instructions to copy backup data to a virtual tape library as indicated by emulated data protection commands of a data protection application (DPA) to copy backup data to a virtual tape library, wherein the DPA copies to the virtual tape library as if the DPA were copying to a physical tape library, and wherein the backup data is divided into user defined application specific subsets based on categories of data, the copying further comprising:
      instructions to copy backup data simultaneously to both a predetermined set of disks and to a default storage area within the virtual tape library so that the backup data copied to the default storage area is maintained in the virtual tape library and the backup data copied to the predetermined set of disks is selectively removed for offsite storage;
      instructions to maintain a log of a sequence of write operations, made by the DPA to both the predetermined set of disks arid the default storage area within the virtual tape to playback the backup data without using the DPA, and to clone the backup data from the virtual tape library to the physical tape library without using the DPA; and
      instructions to manage data storage in the virtual tape library such that the DPA is not aware of decisions made regarding where in the virtual tape library the backup data is stored.

8. The machine readable storage medium of claim 7 wherein the data protection application is aware of the decisions made regarding where in the virtual tape library backup data is stored.

9. A method for creating and using removable disk based copies of backup data, the method comprising:
   using a data protection application (DPA) to copy backup data from a computer network to a virtual tape library, wherein the DPA copies to the virtual tape library using emulated data protection commands as if the DPA were copying to a physical tape library and wherein the backup data is divided into user defined application specific subsets based on categories of data;
   simultaneously copying the backup data to both a predetermined set of disks and a default storage area within the virtual tape library, such that the backup data copied to the default storage area is maintained in the virtual tape library and the backup data copied to the predetermined set of disks is removed for offsite storage;
   storing a sequence log, wherein the sequence log includes the copying operations made by the DPA to the predetermined set of disks and the default storage area within the virtual tape library;
   using a playback operation to clone the backup data from the virtual tape library, wherein the playback operation uses the sequence log to clone the backup data from the virtual tape library to a physical tape library or a virtual tape library, and wherein the DPA is not required for the playback operation; and
   managing data storage in the virtual tape library such that the DPA is not aware of decisions made regarding where in the virtual tape library the backup data is stored.

10. The method of claim 9, wherein the predetermined set of disks is a redundant array of independent disks (RAID).

11. The method of claim 9, wherein the predetermined set of disks is a plurality of removable data blades.

12. The method of claim 9, wherein the predetermined set of disks are powered down separately from the default storage.

* * * * *